ated with a virtual machine (VM) is collected by an application profiling agent. Resource utilization data corresponding to the utilization of resources associated with the execution of the software application is collected by a system resource monitor. The expected workload profile data, the application utilization data, and the resource utilization data are then processed to determine a virtual machine workload class, which is then used to determine a corresponding VM policy. Data associated with the VM policy then processed to generate VM resource allocation instructions, which are in turn processed to provision the VM.

US 8,387,060 B2

United States Patent
Pirzada et al.

(10) Patent No.: US 8,387,060 B2
(45) Date of Patent: Feb. 26, 2013

(54) VIRTUAL MACHINE RESOURCE ALLOCATION GROUP POLICY BASED ON WORKLOAD PROFILE, APPLICATION UTILIZATION AND RESOURCE UTILIZATION

(75) Inventors: Fahd Pirzada, Austin, TX (US); Jeremy M. Ford, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 547 days.

(21) Appl. No.: 12/571,820

(22) Filed: Oct. 1, 2009

(65) Prior Publication Data

US 2011/0083131 A1    Apr. 7, 2011

(51) Int. Cl.
*G06F 9/50* (2006.01)
*G06F 9/455* (2006.01)

(52) U.S. Cl. .......................................... 718/104; 718/1
(58) Field of Classification Search ........................ None
See application file for complete search history.

(56) References Cited

U.S. PATENT DOCUMENTS

| | | | |
|---|---|---|---|
| 2003/0115244 A1* | 6/2003 | Molloy et al. | 709/105 |
| 2005/0198633 A1 | 9/2005 | Lantz et al. | |
| 2007/0016668 A1 | 1/2007 | Rodriguez | |
| 2007/0180436 A1 | 8/2007 | Travostino et al. | |
| 2007/0192641 A1* | 8/2007 | Nagendra et al. | 713/320 |
| 2007/0250838 A1* | 10/2007 | Belady et al. | 718/105 |
| 2007/0283348 A1 | 12/2007 | White | |
| 2008/0183930 A1 | 7/2008 | LaFrance-Linden | |
| 2008/0209428 A1* | 8/2008 | Baryshnikov et al. | 718/104 |
| 2008/0244546 A1 | 10/2008 | Schmelter et al. | |
| 2009/0112644 A1* | 4/2009 | Isom | 705/7 |
| 2010/0199285 A1* | 8/2010 | Medovich | 718/104 |

OTHER PUBLICATIONS

DELL Virtual Desktop Infrastructure Study (copyrighted 2008).*

* cited by examiner

*Primary Examiner* — Meng An
*Assistant Examiner* — Benjamin Wu
(74) *Attorney, Agent, or Firm* — Hamilton & Terrile, LLP; Stephen A. Terrile

(57) ABSTRACT

A system, method, and computer-readable medium are disclosed for automatically allocating resources to a virtual machine. Expected workload profile data and application utilization data corresponding to a software application associated with a virtual machine (VM) is collected by an application profiling agent. Resource utilization data corresponding to the utilization of resources associated with the execution of the software application is collected by a system resource monitor. The expected workload profile data, the application utilization data, and the resource utilization data are then processed to determine a virtual machine workload class, which is then used to determine a corresponding VM policy. Data associated with the VM policy then processed to generate VM resource allocation instructions, which are in turn processed to provision the VM.

17 Claims, 3 Drawing Sheets

| Workload Class (202) | Profiling Agent Input (204) | System Resource Monitor Input (206) |
|---|---|---|
| 1 | Workload Value < 50 | Utilization < 90% |
| 2 | Workload Value < 50 | Utilization > 90% |
| 3 | Workload Value < 150 | Utilization < 75% |
| 4 | Workload Value < 150 | Utilization > 75% |
| 5 | Workload Value > 150 | Utilization < 50% |
| 6 | Workload Value > 150 | Utilization > 50% |

200 / 208

VIRTUAL MACHINE RESOURCE ALLOCATION GROUP POLICY BASED ON WORKLOAD PROFILE, APPLICATION UTILIZATION AND RESOURCE UTILIZATION

BACKGROUND OF THE INVENTION

1. Field of the Invention

The present invention relates to the management of information handling systems. More specifically, embodiments of the invention provide a system, method, and computer-readable medium for automatically allocating resources to a virtual machine.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, it has become common to migrate graphically-intensive client workloads into the datacenter, a trend that is expected to continue and accelerate over time. One reason for this migration has been the growing popularity of virtual machine (VM) environments, which allow the sharing of the underlying physical machine resources between different VM, each running its own operating system and applications. The software layer that provides the virtualization is typically referred to as a virtual machine monitor (VMM) or hypervisor.

A VMM, or hypervisor, typically allocates system resources, such as processor, memory, storage, and input/output (I/O) capacity to each VM. However, this allocation, and subsequent provisioning, is performed statically, regardless of the applications installed or utilized. As a result, a given application may be either over provisioned, which consumes resources that could be used by other applications, or under provisioned, which can have a negative effect on the performance of the application.

SUMMARY OF THE INVENTION

A system, method, and computer-readable medium are disclosed for automatically allocating resources to a virtual machine. In various embodiments, expected workload profile data and application utilization data corresponding to a software application associated with a virtual machine (VM) is collected by an application profiling agent. In these and other embodiments, resource utilization data corresponding to the utilization of resources (e.g., CPU, memory, storage, etc.) associated with the execution of the software application is collected by a system resource monitor.

In these and other embodiments, the expected workload profile data, the application utilization data, and the resource utilization data are then stored in the VM policy database. In various embodiments, the application utilization data is provided in real-time. The VM policy manager then processes the expected workload profile data, the application utilization data, and the resource utilization data stored in the VM policy database to determine a virtual machine workload class, which is then used to determine a corresponding VM policy. Data associated with the VM policy then processed by the VM policy manager to generate virtual machine resource allocation instructions. In turn, the virtual machine resource allocation instructions are processed by one or more VM management tools or a Virtual Remote Desktop (VRD) connection broker to provision the operating system (OS), applications, and user preferences for each VM that hosts client workloads.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for automatically allocating resources to a virtual machine. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figures 1, 2:
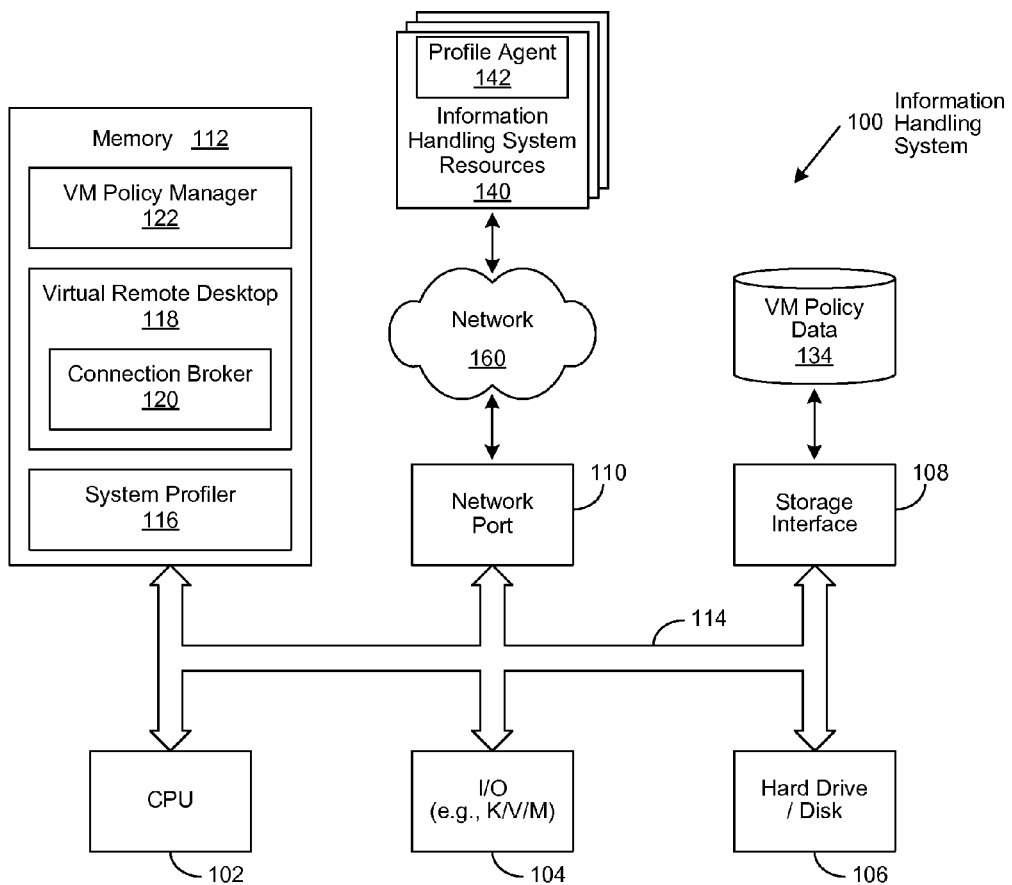
FIG. 1 is a general illustration of components of an information handling system as implemented in the system and method of the present invention.
FIG. 2 shows a simplified table of a virtual machine policy database.

FIG. 1 is a generalized illustration of an information handling system 100 that can be used to implement the method and system of the present invention. The information handling system 100 includes a processor (e.g., central processor unit or "CPU") 102, input/output (I/O) devices 104, such as a display, a keyboard, a mouse, and associated controllers, a hard drive or disk storage 106, various other subsystems, such as a storage interface 108 connected to a repository of virtual machine (VM) policy data 134, a network port 110 operable to connect to a network 160 to provide user access to a plurality of information handling system resources 140, and a system memory 112, all interconnected via one or more buses 114. The plurality of information handling system resources 140 further comprises a corresponding plurality of profile agents 142. The system memory 112 further comprises a system profiler module 116, a Virtual Remote Desktop (VRD) module 118, and a VM Policy Manager 122. As described in greater detail herein, the VRD module 118 further comprises a connection broker 120.

FIG. 2 shows a simplified table of a virtual machine (VM) policy database as implemented in accordance with an embodiment of the invention. In this embodiment, a table 200 of a VM policy database comprises a plurality of VM policies 208, each comprising a workload class 202, an expected workload profile value 204, and a system resource utilization value 206. In various embodiments, the expected workload profile value 204 and system resource utilization value 206 correspond to a software application associated with a virtual machine. In these and other embodiments, expected workload profile data is collected by a profiling agent (e.g., ASAP eSMART+) and system resource utilization data is collected by a system resource monitor (e.g., Dell System Profiler). The collected data is then processed by a VM policy manager to generate the expected workload profile value 204, the system resource utilization value 206, and a corresponding workload class 202.

As an example, a structured task 'B' may have an expected workload value 204 of '11' and a system resource utilization value 206 of '<90%'. As a result, the structured task 'B' would be assigned a workload class 202 of '1'. As another example, a knowledge worker application 'E' may have an expected workload value 204 of '51' and a system resource utilization value 206 of '>75%'. As a result, the knowledge worker application task 'E' would be assigned a workload class 202 of '4'. As yet another example, a graphics-intensive Computer-Aided Design (CAD) application 'H' may have an expected workload value 204 of '151' and a system resource utilization value 206 of '>50%'. As a result, the CAD application 'H' would be assigned a workload class 202 of '6'. It will be apparent to those of skill in the art that many such examples are possible and the foregoing is not intended to limit the spirit, scope, or intent of the invention.

Figures 3, 4:
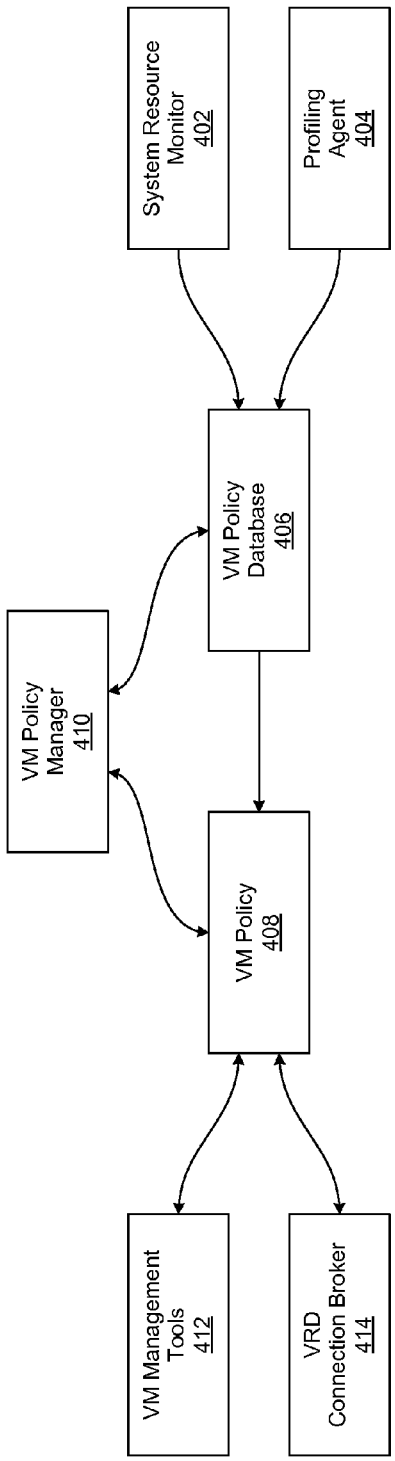
FIG. 3 shows a simplified table of virtual machine policies.
FIG. 4 is a simplified block diagram of the operation of a virtual machine policy manager.

FIG. 3 shows a simplified table of virtual machine (VM) policies as implemented in accordance with an embodiment of the invention. In this embodiment, a table 300 VM policies comprises a plurality of individual VM policies 314, each comprising a workload class 302. In turn, each workload class 302 has a corresponding set of VM policy values, including 'Allocate graphics processing unit (GPU)' 304, 'Enable virtual central processing unit (vCPU) Reallocation' 306, 'Enable virtual graphics processing unit (vCPU) Reallocation' 308, 'Enable Memory Reallocation' 310, and 'Enable VM Migration' 312. As described in greater detail herein, these corresponding sets of VM policy values are processed by a VM policy manager and then provided to VM management tool or a Virtual Remote Desktop (VRD) connection broker for the allocation, and subsequent provisioning, of VM system resources.

As an example, a structured task 'B' may have a workload class 202 of '1'. As a result, all of the corresponding set of VM policy values for 'Allocate graphics processing unit (GPU)' 304, 'Enable virtual central processing unit (vCPU) Reallocation' 306, 'Enable virtual graphics processing unit (vCPU) Reallocation' 308, 'Enable Memory Reallocation' 310, and 'Enable VM Migration' 312 have a value of 'No'. As another example, a knowledge worker application 'E' may have a workload class 202 of '4'. As a result, VM policy values for 'Allocate graphics processing unit (GPU)' 304, 'Enable virtual central processing unit (vCPU) Reallocation' 306, 'Enable virtual graphics processing unit (vCPU) Reallocation' 308, and 'Enable VM Migration' 312 have a value of 'Yes', while 'Enable Memory Reallocation' 310 has a value of 'No'. As yet another example, a graphics-intensive Computer-Aided Design (CAD) application 'H' may have a workload class 202 of '6'. As a result, VM policy values for 'Allocate graphics processing unit (GPU)' 304, 'Enable virtual central processing unit (vCPU) Reallocation' 306, 'Enable virtual graphics processing unit (vCPU) Reallocation' 308, 'Enable Memory Reallocation' 310, and 'Enable VM Migration' 312 all have a value of 'Yes.'

FIG. 4 is a simplified block diagram of the operation of a virtual machine policy manager as implemented in accordance with an embodiment of the invention. In various embodiments, expected workload profile data and application utilization data corresponding to a software application associated with a virtual machine (VM) is collected by an application profiling agent 404 (e.g., ASAP eSMART+). In these and other embodiments, resource utilization data corresponding to the utilization of resources (e.g., CPU, memory, storage, etc.) associated with the execution of the software application is collected by a system resource monitor 402 (e.g., Dell System Profiler).

In these and other embodiments, the expected workload profile data, the application utilization data, and the resource utilization data are then stored in the VM policy database 406. In various embodiments, the application utilization data is provided in real-time. The VM policy manager 410 then processes the expected workload profile data, the application utilization data, and the resource utilization data stored in the VM policy database 406 to determine a virtual machine workload class, which is then used to determine a corresponding VM policy 408. Data associated with the VM policy is then processed by the VM policy manager 410 to generate virtual machine resource allocation instructions. In turn, the virtual machine resource allocation instructions are processed by one or more VM management tools 412 (e.g., Citrix XenCenter, VMWare VirtualCenter, Microsoft VM Manager) or a Virtual Remote Desktop (VRD) connection broker 414.

Skilled practitioners of the art will be aware that in a VRD environment, the connection broker 414 is used for provisioning the operating system (OS), applications, and user preferences for each VM that hosts client workloads. Accordingly, in various embodiments, the VM policy database 406 is used by the VRD connection broker 414 (e.g., VMWare VDI, Citrix Xendesktop) to assign appropriate system resources to a VM before the provisioning process. As an example, if the VRD connection broker 414 is provisioning graphics-intensive computer-aided design (CAD) applications, the VRD connection broker 414 accesses the VM policy database 406 to determine the need for virtual graphics process unit (vGPU) assignment to the VM.

It will be appreciated by those of skill in the art that the static nature of resource assignment used in current approaches may require manual updates to the VM if new applications are installed or existing applications are uninstalled. For example, if the user decides to uninstall graphics-intensive CAD applications from the VM, the virtual GPU assignment is typically not released. However, the use of a VM Policy 408 allows the assignment and reassignment of system resources to be performed automatically in real-time. Furthermore, in instances where the appropriate system resources are not available for a specific VM, the VRD connection broker 414 and the VM Management Tools 412 can use existing mechanisms to migrate the VM to another hardware platform.

Figure 5:
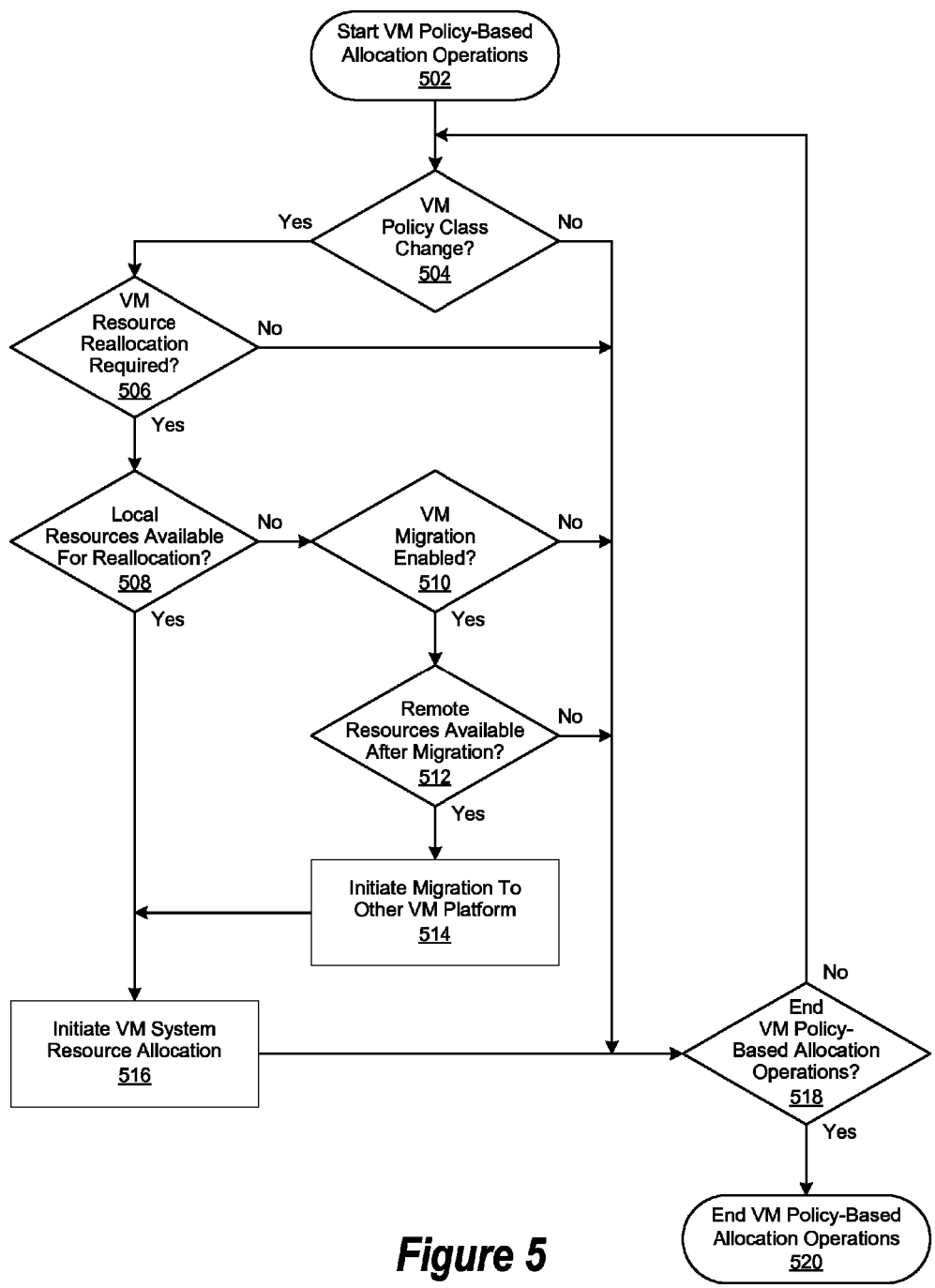
FIG. 5 is a flow chart of the operation of a virtual machine policy manager as implemented to perform virtual machine resource allocation operations.

FIG. 5 is a flow chart of the operation of a virtual machine (VM) policy manager as implemented to perform virtual machine resource allocation operations as implemented in accordance with an embodiment of the invention. In this embodiment, VM policy-based system resource allocation operations are begun in step 502, followed by a determination in step 504 whether there has been a change in the VM policy class associated with a target VM. If not, then a determination is made in step 518 whether to continue VM policy-based system resource allocation operations. If so, then the process is continued, proceeding with step 504. Otherwise, VM policy-based system resource allocation operations are ended in step 520.

However, if it is determined in step 504 that there has been a change in the VM policy class associated with a target VM, then a determination is made in step 506 whether reallocation of VM system resources is required. If not, then a determination is made in step 518 whether to continue VM policy-based system resource allocation operations. If so, then the process is continued, proceeding with step 504. Otherwise, VM policy-based system resource allocation operations are ended in step 520.

However, if it is determined in step 506 that a reallocation of VM system resources is required, then a determination is made in step 508 whether sufficient VM system resources are available on the local physical platform for reallocation. If not, then a determination is made in step 510 whether migration of the VM to another physical platform is enabled. If not, then a determination is made in step 518 whether to continue VM policy-based system resource allocation operations. If so, then the process is continued, proceeding with step 504. Otherwise, VM policy-based system resource allocation operations are ended in step 520.

However, if it is determined in step 510 that whether migration of the VM to another physical platform is enabled, then a determination is made in step 512 whether sufficient VM system resources are available on another physical platform. If not, then a determination is made in step 510 whether migration of the VM to another physical platform is enabled. If not, then a determination is made in step 518 whether to continue VM policy-based system resource allocation operations. If so, then the process is continued, proceeding with step 504. Otherwise, VM policy-based system resource allocation operations are ended in step 520.

However, if it is determined in step 512 that sufficient VM system resources are available on another physical platform, then migration of the VM to another physical platform is initiated in step 514. Thereafter, or if it was determined in step 508 that sufficient VM system resources are available on the local physical platform for reallocation, then allocation of the VM system resources is initiated in step 516. A determination is made in step 518 whether to continue VM policy-based system resource allocation operations. If so, then the process is continued, proceeding with step 504. Otherwise, VM policy-based system resource allocation operations are ended in step 520.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for allocating resources to a virtual machine, comprising:
   a storage medium comprising a repository of virtual machine policy data; and
   processing logic operable to:
      receive from a profiling agent expected workload profile data and application utilization data corresponding to a software application associated with a virtual machine;
      receive resource utilization data from the profiling agent corresponding to utilization of resources associated with execution of the software application;
      process the expected workload profile data, the application utilization data, and the resource utilization data to determine a corresponding virtual machine workload class;
      retrieve and process virtual machine policy data associated with the virtual machine workload class to generate virtual machine resource allocation instructions; and
      process the virtual machine resource allocation instructions to allocate resources to the virtual machine.

2. The system of claim 1, wherein the profiling agent collects the expected workload profile data and the application utilization data in real-time.

3. The system of claim 1, wherein the resource utilization data is collected by a system resource monitor.

4. The system of claim 1, wherein the virtual machine resource allocation instructions are processed to provision the virtual machine with virtual machine resources.

5. The system of claim 4, wherein a connection broker of a virtual remote desktop is used to process the virtual machine resource allocation instructions.

6. A computer-implemented method for allocating resources to a virtual machine, comprising processing logic used for:

using a storage medium comprising a repository of virtual machine policy data;

receiving from a profiling agent expected workload profile data and application utilization data corresponding to a software application associated with a virtual machine;

receiving resource utilization data from the profiling agent corresponding to utilization of resources associated with execution of the software application;

processing the expected workload profile data, the application utilization data, and the resource utilization data to determine a corresponding virtual machine workload class;

retrieving and processing virtual machine policy data associated with the virtual machine workload class to generate virtual machine resource allocation instructions; and processing the virtual machine resource allocation instructions to allocate resources to the virtual machine.

7. The method of claim 6, wherein the profiling agent collects the expected workload profile data and the application utilization data in real-time.

8. The method of claim 6, wherein the resource utilization data is collected by a system resource monitor.

9. The method of claim 6, wherein the virtual machine resource allocation instructions are processed to provision the virtual machine with virtual machine resources.

10. The method of claim 9, wherein a connection broker of a virtual remote desktop is used to process the virtual machine resource allocation instructions.

11. A non-transitory computer-readable storage medium storing computer program code, the computer program code comprising computer executable instructions configured for:

using a storage medium comprising a repository of virtual machine policy data;

receiving from a profiling agent expected workload profile data and application utilization data corresponding to a software application associated with a virtual machine;

receiving resource utilization data from the profiling agent corresponding to utilization of resources associated with execution of the software application;

processing the expected workload profile data, the application utilization data, and the resource utilization data to determine a corresponding virtual machine workload class;

retrieving and processing virtual machine policy data associated with the virtual machine workload class to generate virtual machine resource allocation instructions; and processing the virtual machine resource allocation instructions to allocate resources to the virtual machine.

12. The non-transitory computer-readable storage medium of claim 11, wherein the profiling agent collects the expected workload profile data and the application utilization data in real-time.

13. The non-transitory computer-readable storage medium of claim 11, wherein the resource utilization data is collected by a system resource monitor.

14. The non-transitory computer-readable storage medium of claim 11, wherein the virtual machine resource allocation instructions are processed to provision the virtual machine with virtual machine resources.

15. The non-transitory computer-readable storage medium of claim 14, wherein a connection broker of a virtual remote desktop is used to process the virtual machine resource allocation instructions.

16. The non-transitory computer-readable storage medium of claim 11, wherein the computer executable instructions are deployable to a client computer from a server at a remote location.

17. The non-transitory computer-readable storage medium of claim 11, wherein the computer executable instructions are provided by a service provider to a customer on an on-demand basis.

* * * * *